UNITED STATES PATENT OFFICE.

WILLARD E. CASE, OF AUBURN, NEW YORK.

PROCESS OF MAKING ELECTRODES.

SPECIFICATION forming part of Letters Patent No. 289,386, dated December 4, 1883.

Application filed August 24, 1883. (No specimens.)

*To all whom it may concern:*

Be it known that I, WILLARD E. CASE, of Auburn, Cayuga county, New York, have invented a certain new and useful Process of Making Electrodes for Secondary Batteries, of which the following is a specification.

My invention relates to secondary-battery elements; and said invention consists in the following-described process for making said elements porous, and so causing them to expose a large active surface.

In carrying out my process I employ lead, or preferably an alloy of lead, with a non-oxidizable metal—such, for example, as antimony or bismuth. The advantages of adding the non-oxidizable metal are that it lowers the fusing-point of the alloy, rendering the material easier to work, and it also acts as a binding material for the electrode and reduces the internal resistance of the battery. I first melt the lead or the alloy. I then withdraw the source of heat, and by any suitable means I stir the melted metal or alloy until it has come to a finely-divided condition, and sufficiently cooled to render it plastic, so that it may be conveniently placed in a mold and therein pressed to suitable form. The exact degree of plasticity or quality of coherence of the metal is not material. It should be stirred as long as possible, or, in other words, until stirring becomes difficult, owing to the tendency of the metal to solidify. I find by experiment that this stirring process prevents crystallization of the material, so that when the mass is finally allowed to cool the small particles thereof cohere at their points of contact, thus leaving the body very porous.

I am aware that it is not new to agitate molten lead until it is reduced to a powder, which powder, in a cold state, is combined with other ingredients to form an electrode.

I claim as my invention—

1. The process of manufacturing elements for secondary batteries, consisting in first melting the material or materials of which the element is to be composed, and then, while said material is in a melted state, stirring the same until it becomes cooled to a plastic and finely-divided condition, and then, while still plastic, pressing or molding said material into suitable shape, substantially as described.

2. The process of manufacturing elements for secondary batteries, consisting in first melting lead, or an alloy of lead, and a non-oxidizable metal, and then, while said lead or alloy is in a melted state, stirring the same until it becomes cooled to a plastic and finely-divided condition, and then, while still plastic, pressing or molding said lead or alloy into suitable shape, substantially as described.

WILLARD E. CASE.

Witnesses:
 CHAS. O'BRIEN.
 M. F. BACKUS.